United States Patent
Sano

(10) Patent No.: US 6,272,912 B1
(45) Date of Patent: Aug. 14, 2001

(54) STEERING ANGLE SENSOR UNIT

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/506,313

(22) Filed: Feb. 17, 2000

(30) Foreign Application Priority Data

Feb. 22, 1999 (JP) .................................. 11-043212

(51) Int. Cl.⁷ ............................ G01M 19/00; G01M 7/00
(52) U.S. Cl. ............................................. 73/118.1; 33/1 N
(58) Field of Search ........................... 73/118.1, 862.191, 73/862.08; 340/438; 33/1 PT, 1 N

(56) References Cited

U.S. PATENT DOCUMENTS

| | | | |
|---|---|---|---|
| 5,088,319 | * 2/1992 | Hirose et al. | 73/118.1 |
| 5,218,769 | * 6/1993 | Tranchon | 33/1 PT |
| 5,309,758 | * 5/1994 | Kubota et al. | 73/118.1 |
| 5,373,444 | * 12/1994 | Takahashi . | |
| 5,734,160 | * 3/1998 | Chung et al. . | |
| 5,818,038 | * 10/1998 | Kerkmann et al. . | |
| 5,930,905 | * 8/1999 | Zabler et al. | 33/1 PT |
| 6,144,027 | * 11/2000 | Weber . | |
| 6,155,106 | * 12/2000 | Sano | 73/118.1 |

* cited by examiner

*Primary Examiner*—Eric S. McCall
(74) *Attorney, Agent, or Firm*—Brinks Hofer Gilson & Lione

(57) ABSTRACT

The present invention provides a steering angle sensor unit, which can make an amount of rotation of a first rotor equal to that of rotation of a rotary member and which can accurately detect the rotation of the first rotor. The steering angle sensor unit comprises a rotary connector, which has first and second rotors, placed across a stator in such a way as to face each other and connected to each other through a through hole and rotatably supported, and which has a flexible cable, placed in such a manner as to be wound around the first, second rotors, and the stator, and as to have an end portion supported by the stator and the other end portion supported by the first rotor, and also comprises a steering angle sensor, which has a rotary member rotatably supported by the stationary member and which has an amount-of-rotation detection for detecting an amount of rotation of this rotary member. An extension portion is provided in one, which is more apart from the rotary member, of the first rotor and the rotary member. The first rotor is directly connected to the rotary member by this extension portion. The first and second rotors and the rotary member are rotated as a single body by operating the first rotor.

12 Claims, 7 Drawing Sheets

STEERING ANGLE SENSOR UNIT

BACKGROUND OF THE INVENTION

1. Field of the Invention

The present invention relates to a steering angle sensor unit, attached to a steering shaft of an automobile or the like, for detecting information on rotation of a steering wheel, and for electrically connecting electric devices respectively provided in the steering wheel and a vehicle body.

2. Description of the Related Art

FIGS. 10 and 11 illustrate a conventional one of such a steering angle sensor unit. This conventional steering angle sensor unit 31 consists of a rotary connector 32 and a steering sensor 46. The rotary connector 32 comprises a stator 37, which is operative to support a first rotor 33 and a second rotor 45 connected to each other in such a manner as to be rotatable, a rotary-side lead block 34 supported by the first rotor, a stationary-side lead block 41 supported by the stator 37, and a flexible cable 44 accommodated in the stator 37.

The first rotor 33 is formed from an insulating material like a cylinder. A flange portion 33a is integrally formed like a ring in such a manner as to extend over the entire circumference of an outer wall at the top end portion of the first rotor 33. A U-shaped holding portion 33b is erected on the top surface of this flange portion 33a along an edge portion of a rectangular hole bored in a part of the flange portion 33a. A step-like portion 33c extending radially is formed on the inner circumferential wall of the first rotor 33, as illustrated in FIG. 11. A pair of engaging projections 33d are provided on the top surface of this step-like portion 33c in such a way as to be separated 180°, and have top end portions, each of which projects from the first rotor 33.

The rotary-side lead block 34 has a top end portion, to which a connector 36 is attached through a connecting cable 35, and has a bottom end portion attached to the first rotor 33 in such a fashion as to be protruded downwardly from the rectangular hole of the first rotor 33 and held by the holding portion 33b.

The stator 37 consists of a cylindrical cable case 38 and a disk-like lower cover 39, both of which are formed from an insulating material. A top surface plate 38a is integrally formed at the top end portion of the cable case 38 in such a manner as to extend over the entire inner circumference of the case 38 and as to have an opening 38b at the central portion thereof. The lower cover 39 has a hole 39a formed in the central portion thereof and an arcuate groove 39b opened at an end thereof to the outer circumferential portion, and is attached to the bottom end portion of the cable case 38. The hole 39a and the opening 38b of the cable case 38 face to each other and constitute a through hole 40. Moreover, the inside of the cable case 38 communicates with the outside thereof through the groove 39b. Further, the first rotor 33 is inserted from the opening 38b into this stator 37. The flange portion 33a abuts against the top surface plate 38a. Furthermore, the bottom end portion of the rotary-side lead block 34 is placed in the cable connector 38. The connecting cable 35 and the connector 36 are placed outside the stator 37.

The stationary-side lead block 41 has a top end portion, to which a connector 43 is attached through a connecting cord 42, and a bottom end portion supported by the lower cover 39 and is placed in the stator 37. Further, the connecting cord 42 and the connector 43 are led to the outside of the stator 37 through the groove 39b of the lower cover 39.

The flexible cable 44 is constituted by embedding a plurality of electrically conductive wires in flexible elongated tape in such a way as to extend in the longitudinal direction of the tape. Both end portions of any of the electrically conductive wires are exposed from the surface of the tape at both end portions of the tape. Further, this flexible cable 44 is wound around the outer circumferential wall of the first rotor 33 and accommodated in the stator 37. The flexible cable 44 has an end portion, which is supported by the bottom end portion of the rotary-side lead block 34 and electrically connected to the connector 36 through the connecting cord 35, and also has the other end portion that is supported at the top end portion of the stationary-side lead block 41 and electrically connected to the connector 43 through the connecting cord 42.

The second rotor 45 is formed from an insulating material like a cylinder, and has a top end portion, in which a claw portion 45a is integrally formed like a ring in such a way as to extend over the outer circumferential wall and in which a pair of notch portions 45b are shaped like the contour of a pen head tapered off toward the bottom end thereof and opposed to each other. Further, a flange portion 45c is integrally formed to the bottom end portion of the second rotor 45 and shaped like a ring in such a manner as to extend over the entire circumference of the outer circumferential wall. A pair of hole portions 45d are bored in this flange portion 45c in such a way as to be separated 180°. Further, this second rotor 45 is inserted into the stator 37 from the hole 39a of the lower cover 39. The second rotor 45 is connected through the through hole 40 to the first rotor 33 by latching the claw portion 45a onto the step-like portion 33c of the first rotor 33 and holding the claw portion 45a. The second rotor 45 is rotatably supported by the stator 37 together with the first rotor 33 so that the flange portion 45c abuts against the bottom surface of the lower cover 39.

On the other hand, the steering angle sensor 46 comprises a rotary member 55, which connects an upper rotary member 47 to a lower rotary member 48, a stationary member 48, which supports this rotary member 55 so that this rotary member 55 can rotate, and an amount-of-rotation detecting means 51 that is supported by the stationary member 48 and adapted to detect an amount of rotation of the rotary member 55.

The upper rotary member 47 is formed from an insulating material like a cylinder. A flange portion 47a is integrally formed like a ring in such a manner as to extend over the entire circumference of an outer wall at the top end portion of the upper rotary member 47. A pair of projection portions 47b are formed on the top surface of this upper rotary member 47 in such a way as to be separated 180°. Further, an extension portion 47c inwardly extending over the entire circumference of the upper rotary member 47 is formed like a ring on the bottom portion of the member 47. A pair of convex portions 47d projecting downwardly are provided on this extension portion 47c in such a manner as to be separated 180°. Moreover, a ring-like projection 47e is provided in such a way as to face the inner circumferential wall of the upper rotary member 47 and to be extended from this portion 47c.

The stationary member 48 is constituted by an upper insulating case 49 and a lower insulating case 50 and formed like a cylinder. A top surface plate 49a of the upper case 49 and a bottom surface plate 50a of the lower case 50 have hole portions 49b and 50b, respectively. Further, the upper rotary member 47 is inserted from the hole portion 49b of the upper case 49 into this stationary member 48. The flange portion 47a abuts against the top surface plate 49a of the upper case 49. The extension portion 47c and the pair of convex portions 47d are placed in the stationary member 48.

The amount-of-rotation detecting means 51 comprises a disk-like code plate 52, in which a plurality of slits 52a are formed at a predetermined interval in a circumferential direction, and a detecting device 53 having a light emitting element 53a and a light receiving element 53b placed on an outer circumferential portion of this code plate 52 in such a manner as to put the slits 52a therebetween. A pair of holes 52b are formed in this code plate 52 in such a manner as to be shifted in phase at an interval of 180°. Further, the amount-of-rotation detecting means 51 is placed in the stationary member 48. The pair of convex portions 47d are inserted into the pair of holes 52b of the code plate 52, respectively. The detecting device 53 is supported by the inner circumferential wall of the upper case 49.

The lower rotary member 54 is formed from an insulating material like a cylinder. A flange portion 54a is integrally formed like a ring in such a manner as to extend over the entire circumference of an outer wall at the bottom end portion of the lower rotary member 54. A pair of concave portions 54b are formed on the top surface of this lower rotary member 54 in such a way as to be separated 180°. Further, this lower rotary member 54 is inserted into the stationary member 48 from the hole portion 50b of the lower case 50. The pair of convex portions 47d of the upper rotary member 47 are fitted into the pair of concave portions 54b, respectively. Thus, the code plate 52 is sandwiched between the upper and lower cases. The lower rotary member 54 is rotatably supported by the stationary member 48 together with the upper rotary member 47 by causing the flange portion 54a to abut against the bottom surface plate 50a of the lower case 50.

Furthermore, in the steering angle sensor 46 configured as described above, a coil spring 56 is put on the ring-like projection 47e. The upper rotary member 47 is placed in such a manner as to face the second rotor 45. The upper case 49 is attached to the lower cover 39 of the rotary connector 32 by using appropriate means, such as screws. Thus, the steering angle sensor unit 31 is configured by being fixed to the rotary connector 32. The pair of projections 47b are placed in the pair of hole portions 45d of the second rotor 45. The coil spring 56 compressed and sandwiched between the ring-like projection 47e and the flange portion 45c of the second rotor 45 presses the second rotor 45 and the upper rotary member 47 in a direction in which the rotor 45 becomes a little more apart from the member 47. Consequently, the flange portion 47a is a little apart from the flange portion 45c of the second rotor 45.

Next, a method of assembling this steering angle sensor unit 31 will be described hereinbelow. First, the rotary connector 32 is assembled as follows. That is, the rotary-side lead block 34, to which the connector 36 is attached through the connecting cord 35, is fitted into the holding portion 33d of the first rotor 33. Then, the first rotor 33 is inserted from the opening 38b into the cable case 38. Thus, the flange portion 33a is caused to abut against the top surface plate 38a. Subsequently, the stationary-side lead block 41, to which the connector 43 is attached through the connecting cord 42, is attached to the lower cover 39. A part, which is provided to the stationary-side lead block 41, of the connecting cord 42 is fitted into the groove 39b of the lower cover 39. Next, in the cable case 38, the flexible cable 44 is wound around the first rotor 33. Then, both end portions of the flexible cable 44 are respectively attached to the bottom end portion of the rotary-side lead block 34 and the top end portion of the stationary-side lead block 41. Thereafter, the lower cover 39 is attached to the bottom end portion of the cable case 38 by using suitable means, such as screws.

Further, when the second rotor 45 is inserted into the stator 37 from the hole 39a of the lower cover 39, the claw portion 45a formed at the top end portion of the second rotor 45 touches the step-like portion 33c of the first rotor 33. When the second rotor 45 is pushed still more into the stator 37 in this state, the claw portion 45a and the second rotor 45 inwardly bend owing to the elasticity of the second rotor 45. Furthermore, when the claw portion 45a passes through the step-like portion 33c, the claw portion 45a and the second rotor 45 are restored to an original state. Then, the claw portion 45a is caught onto the step-like portion 33c and held thereon. That is, the second rotor 45 is connected to the first rotor 33 by snap fit or stop.

In the rotary connector 32 assembled in this way, the flexible cable 44 is placed between the first rotor 33 and the second rotor 45. The flange portions 33a and 45c of the first and second rotors 33 and 45 abut against the top surface plate 38a of the cable case 38 and the bottom surface of the lower cover 39, respectively. Further, the connectors 36 and 43 are placed outside the stator 37.

On the other hand, the steering angle sensor 46 is assembled as follows. First, the detecting device 53 having the light emitting element 53a and the light receiving element 53b is supported on the inner circumferential wall of the upper case 49. Then, the code plate 52 is placed between the light emitting element 53a and the light receiving element 53b. Subsequently, the upper rotary member 47 is inserted from the hole portion 49b into the upper case 49. The extension portion 47c is made to abut against the code plate 52 by inserting the pair of convex portions 47d into the pair of holes 52b. Then, the lower case 50 and the upper case 49 are combined with each other and attached to each other by using suitable means, such as screws. Subsequently, the lower rotary member 54 is inserted from the hole portion 50b of the lower case 50 into the stationary member 48. Then, the pair of convex portions 47d are fitted into the pair of concave portions 54b. Thus, the lower rotary member 54 is attached to the upper rotary member 47.

In the steering angle sensor 46 assembled in this way, the flange portion 47a of the upper rotary member 47 abuts against the top surface plate 49a of the upper case 49. Moreover, the flange portion 54a of the lower rotary member 54 abuts against the bottom surface plate 50a of the lower case 50. Furthermore, the code plate 52 is sandwiched between the extension portion 47c of the upper rotary member 47 and the top end portion of the lower rotary member 54.

Further, thereafter, the coil spring 56 is put on the cylindrical projection 47e of the upper rotary member 47. The upper case 49 is attached to the lower cover 39 of the rotary connector 32 by using appropriate means, such as screws. Thus, the assembling of the steering angle sensor unit 31 is completed. Upon completion of assembling thereof, the coil spring 56 is compressed and sandwiched between the ring-like projection 47e and the flange portion 45c of the second rotor 45. The second rotor 45 and the upper rotary member 47 are pushed by the coil spring 56 in a direction in which the rotor 45 becomes a little more apart from the member 47.

The steering angle sensor unit 31 assembled in this way is incorporated into an automobile or the like. The stator 37 of the rotary connector 32 is fixed to a car body. The pair of engaging projections 33d of the first rotor 33 are connected to a hub of a steering shaft. Thus, the connector 36 is connected to an air bag or a horn provided on the steering wheel, while the connector 43 is connected to a drive circuit for an air bag or a horn provided on the car body. Furthermore, the detecting device 53 is used by being connected to a computer for controlling the car body. Namely, when the steering wheel is operated, the first rotor 33 rotates in response to this operation. Thus, the flexible cable 44 is wound or rewound, so that the electrical connection between the steering wheel and the car body is always maintained. The engagement between the pair of projections 47b and the pair of hole portions 45d enables the transmission of rotation of the first rotor 33 to the rotary member 55 through the second rotor 45 with the result that the rotary member 55 rotates. Thus, light emitted from the light emitting element 53a provided in the detecting device 53 is received by the light receiving element 53b through the slits 52a, so that an amount of rotation of the code plate 52 is detected. A detection signal obtained in this way is inputted to the computer provided in the car body. Then, this computer controls a suspension damping system in response to the operation of the steering wheel, and a shift position of an automatic transmission, and a rear wheel steering mechanism of a 4-wheel steering system (4WS).

However, in the aforementioned steering angle sensor unit, the rotation of the first rotor 33 is transmitted to the rotary member 55 through the second rotor 45. The first and second rotors 33 and 45 are connected to each other by snap fit. Thus, as the first rotor 33 rotates, a play between the first and second rotors 33 and 45 is caused owing to change with time. Consequently, the amount of rotation of the first rotor 33 is not equal to that of rotation of the rotary member 55. Therefore, the amount-of-rotation detecting means 51 cannot detect an operation of the steering wheel. Thus, there is a fear that the computer cannot perform the aforementioned various kinds of control operations with good precision in response to an operation of the steering wheel.

The present invention is accomplished in view of the aforementioned circumstances.

SUMMARY OF THE INVENTION

Accordingly, an object of the present invention is to provide a steering angle sensor unit, which can make the amount of rotation of the first rotor equal to that of rotation of the rotary member and which can accurately detect the rotation of the first rotor.

To achieve the foregoing object, according to the present invention, there is provided a steering angle sensor unit (hereunder sometimes referred to as a first means of the present invention) that comprises a rotary connector, which has a stator having a through hole, first and second rotors, placed across the stator in such a way as to face each other and connected to each other through a through hole and rotatably supported, and a flexible cable, placed in such a manner as to be wound around the first, second rotors, and the stator, and as to have an end portion supported by the stator and the other end portion supported by one of the first and second rotors, and also comprises a steering angle sensor, which has a rotary member rotatably supported by the stationary member and an amount-of-rotation detecting means for detecting an amount of rotation of this rotary member. The second rotor is made to face the rotary member. The first rotor is placed more apart from the rotary member. An extension portion is provided in one of the first rotor and the rotary member. The first rotor is directly connected to the rotary member by this extension portion. The first and second rotors and the rotary member are rotated as a single body by transmitting rotation of the first rotor to the rotary member.

As described above, according to the first means of the present invention, the second rotor is made to face the rotary member. Further, the first rotor is placed more apart from the rotary member. The extension portion is provided in one of the first rotor and the rotary member. The first rotor is directly connected to the rotary member by this extension portion. The first and second rotors and the rotary member are rotated as a single body by transmitting rotation of the first rotor to the rotary member. Thus, the amount of rotation of the first rotor can be always made to be equal to that of rotation of the rotary member. Consequently, the amount of rotation of the first rotor can be accurately detected by the amount-of-rotation detecting means.

Further, according to an embodiment (hereunder sometimes referred to as a second means of the present invention) of the first means, the first rotor is formed like a cylinder. The first rotor is caught onto the second rotor and held thereon. The extension portion is provided on the bottom end portion of the first rotor. A passage portion, in which the extension portion is inserted, is provided in the second rotor. The extension portion is inserted in and engaged with the passage portion. Thus, the first and second rotors and the rotary member are rotated as a single body.

Furthermore, according to the second means of the present invention, in the first means of the present invention, the first rotor is formed like a cylinder. The first rotor is caught onto the second rotor and held thereon. The extension portion is provided on the bottom end portion of the first rotor. The passage portion, in which the extension portion is inserted, is provided in the second rotor. The extension portion is inserted in and engaged with the passage portion. Thus, the first and second rotors and the rotary member are rotated as a single body. Thus, the first and second rotors can smoothly rotate as a single body without a play therebetween. Moreover, there is the narrow space on the bottom end portion of the cylindrical first rotor. The extension portion is far easier to be formed in the narrow space, as compared with the passage portion. Consequently, the second means is effective particularly in enhancing the productivity of the sensor unit.

Moreover, according to an embodiment (hereunder sometimes referred to as a third means of the present invention) of the first or second means, an elongated hole extending in a direction perpendicular to an axis of rotation is provided in the rotary member. An outer circumferential surface, with which the elongated hole is engageable in a transversal direction thereof, is provided in the extension portion. The extension portion is inserted into the elongated hole. A space is formed in the longitudinal direction of the elongated hole. The outer circumferential surface engages with the elongated hole in the transversal direction of the hole. The extension portion is slidable in the longitudinal direction of the elongated hole.

Furthermore, according to the third means of the present invention, the elongated hole extending in the direction perpendicular to the axis of rotation is provided in the rotary member. The outer circumferential surface, with which the elongated hole is engageable in the transversal direction thereof, is provided in the extension portion. The extension portion is inserted into the elongated hole. The space is formed in the longitudinal direction of the elongated hole. The outer circumferential surface engages with the elongated hole in the transversal direction of the hole. The extension portion is slidable in the longitudinal direction of the elongated hole. Thus, the first rotor can be connected to the rotary member by a simple configuration. If a backlash is caused during the first and second rotors rotate in a direction perpendicular to the axis of rotation, this backlash is absorbed by winding and rewinding the flexible cable and by causing the extension portion to slide in the longitudinal direction of the elongated hole by being guided by the elongated hole. Consequently, each of the first and second rotors and the rotary member can smoothly rotate.

Further, according to an embodiment (hereunder sometimes referred to as a fourth means of the present invention) of the third means, a pair of elastic pieces extending in a direction nearly perpendicular to the axis of rotation are provided in the rotary member. A projection is provided on the first rotor. This projection is sandwiched between the pair of elastic pieces.

Moreover, according to the fourth means, the pair of elastic pieces extending in a direction nearly perpendicular to the axis of rotation are provided in the rotary member. The projection is provided on the first rotor. This projection is sandwiched between the pair of elastic pieces. Thus, if a backlash is caused between the first and second rotors in a direction of rotation of each of these rotors, this backlash is absorbed by the bending in the pair of elastic pieces. The rotation of each of the first and second rotors can be reliably transmitted to the rotary member in collaboration with the extension portion. Consequently, an amount of each of the first and second rotors can be detected with good accuracy by the amount-of-rotation detecting means.

Additionally, in the case of an embodiment (hereunder sometimes referred to as a fifth means) of the first, second, third, or fourth means, a coil spring is disposed between the second rotor and the rotary member. Moreover, this spring pushes the second rotor and the rotary member in a direction in which the second rotor and the rotary member become apart from each other.

Further, according to the fifth means, the coil spring is disposed between the second rotor and the rotary member in the first, second, third, or fourth means. Moreover, this spring pushes the second rotor and the rotary member in the direction in which the second rotor and the rotary member become apart from each other. Thus, during the first and second rotors rotate in the direction parallel with the axis of rotation, if a backlash is caused therebetween, the backlash can be made to be small by pressing the second rotor. Consequently, the first and second rotors can be stably rotated.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 1:
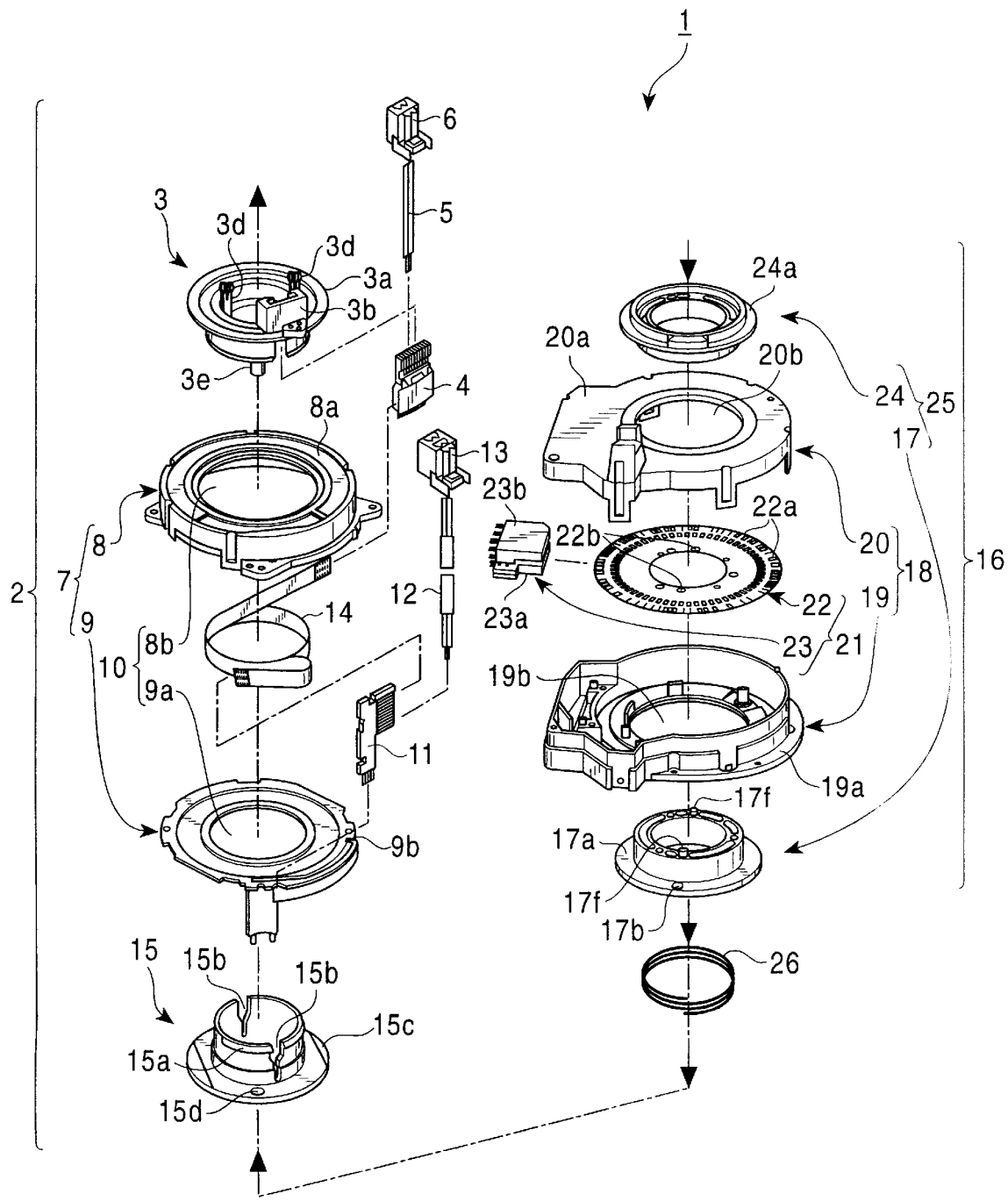
FIG. 1 is an exploded perspective view of a steering angle sensor unit, which is an embodiment of the present invention.
Figure 2:
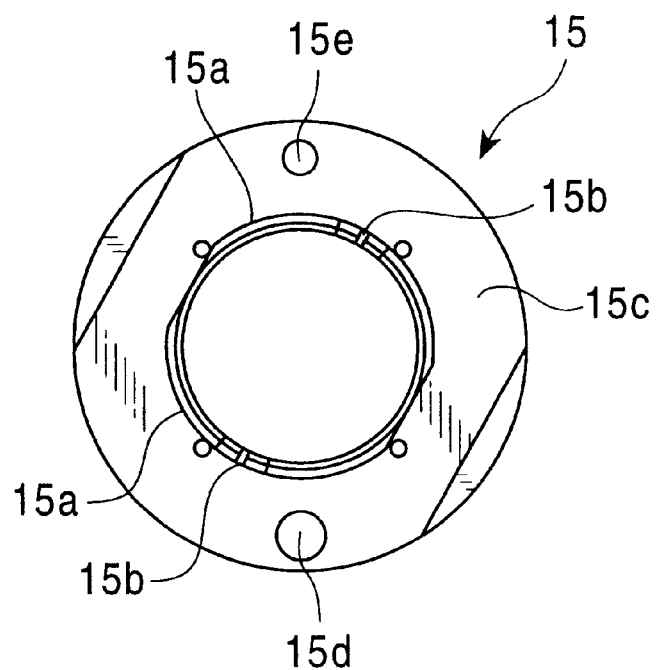
FIG. 2 is a plan view of a second rotor of a rotary connector of the steering angle sensor unit embodying the present invention.
Figure 3:
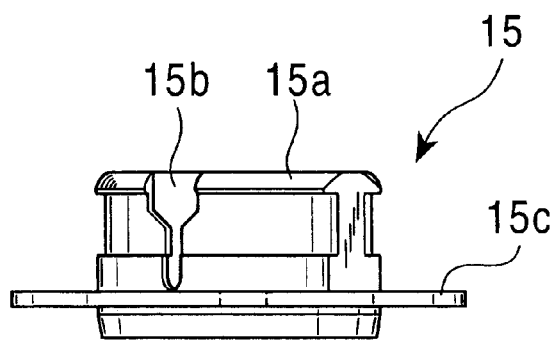
FIG. 3 is a side view of the second rotor of the rotary connector of the steering angle sensor unit embodying the present invention.
Figure 4:
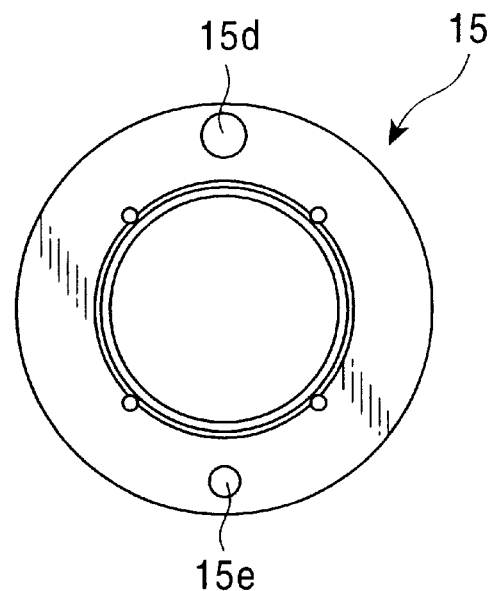
FIG. 4 is a rear view of the second rotor of the rotary connector of the steering angle sensor unit embodying the present invention.
Figure 5:
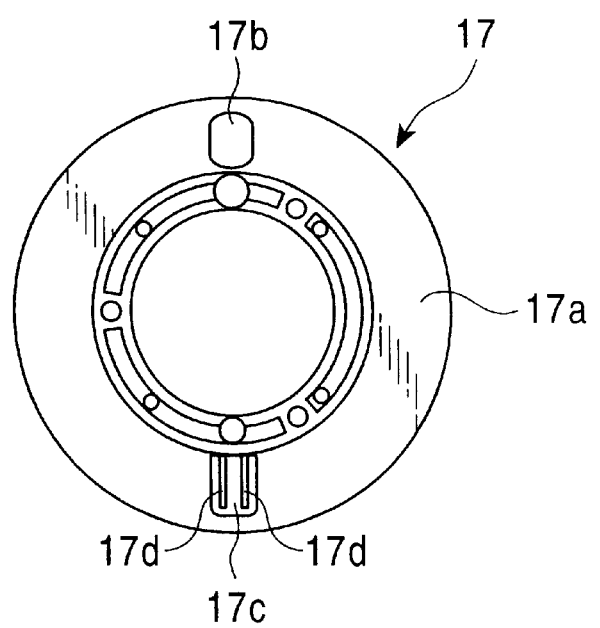
FIG. 5 is a rear view of an upper rotary member of a steering angle sensor of the steering angle sensor unit embodying the present invention.
Figure 6:
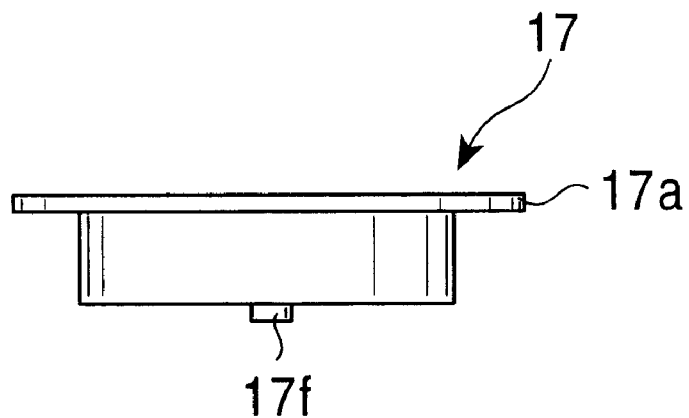
FIG. 6 is a side view of the upper rotary member of the steering angle sensor of the steering angle sensor unit embodying the present invention.
Figure 7:
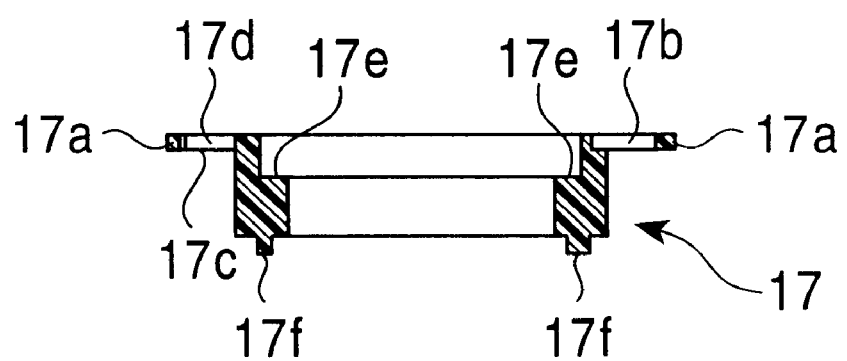
FIG. 7 is a sectional view of the upper rotary member of the steering angle sensor of the steering angle sensor unit embodying the present invention.

Hereinafter, a preferred embodiment of the present invention will be described in detail by referring to FIGS. 1 to 9.

This steering angle sensor unit 1 consists of a rotary connector 2 and a steering sensor 16. The rotary connector 2 comprises a stator 7, which has a through hole 10, and also comprises a first rotor 3 and a second rotor 15, which are placed in such a manner as to face each other and sandwich this stator 7 therebetween and connected to each other through a through hole 10 and rotatably supported by the stator 7. Moreover, the rotary connector 2 further comprises a rotary-side lead block 4 supported by the first rotor 3, a stationary-side lead block 11 supported by the stator 7, and a flexible cable 14, which is accommodated in the stator 7 and which has an end portion supported by the rotary-side lead block 4 and has the other end portion supported by the stationary-side lead block 11.

Figure 8:
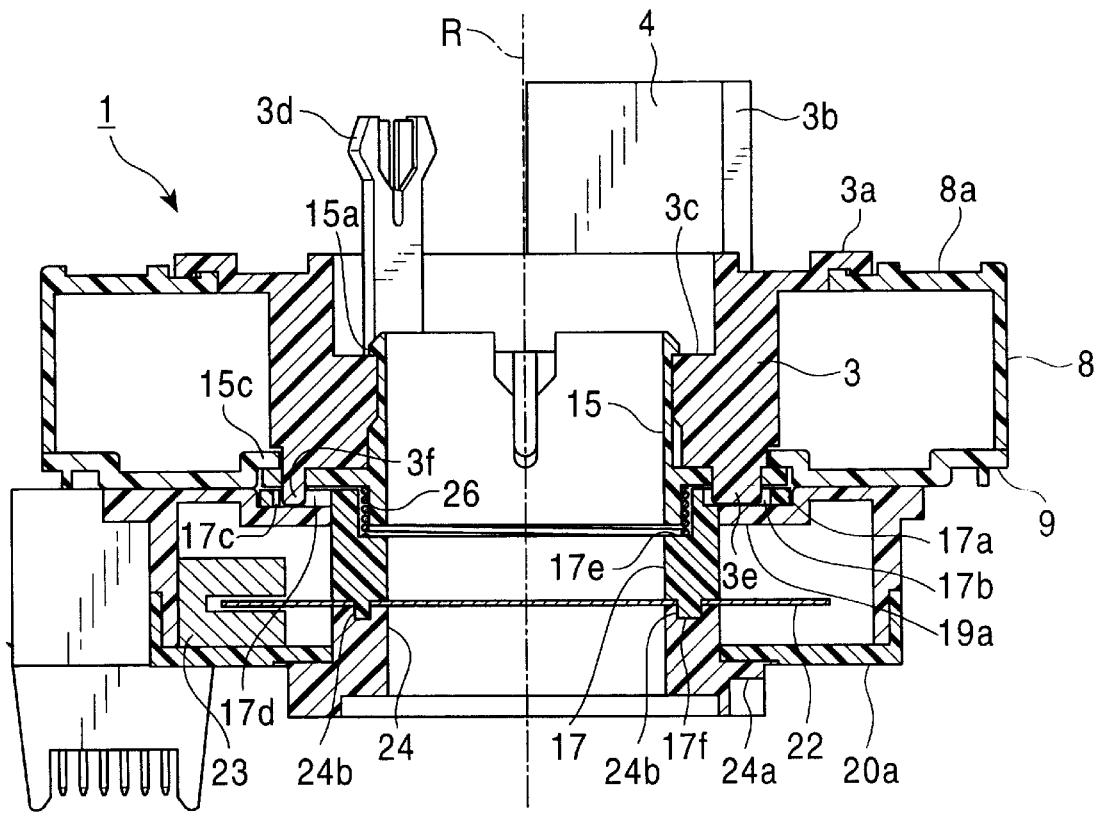
FIG. 8 is a sectional view of a steering angle sensor unit.

The first rotor 3 is formed from an insulating material like a cylinder. A flange portion 3a is integrally formed like a ring in such a manner as to extend over the entire circumference of an outer wall at the top end portion of the first rotor 3. A U-shaped holding portion 3b is erected on the top surface of this flange portion 3a along an edge portion of a rectangular hole bored in a part of the flange portion 3a. A ring-like step portion 3c extending radially is formed on the inner circumferential wall of the first rotor 33, as illustrated in FIG. 8. A pair of engaging projections 3d are provided on the top surface of this step portion 3c in such a way as to be separated 180°, and have top end portions, each of which projects from the first rotor 3. Further, a cylindrical extension portion 3e and a cylindrical projection 3f are formed on the bottom end portion of the first rotor 3 in such a manner as to be separated 180°. The extension portion 3e has a larger diameter, as compared with the projection 3f.

The rotary-side lead block 4 has a top end portion, to which a connector 6 is attached through a connecting cord 5, and has a bottom end portion attached to the first rotor 3 in such a fashion as to be protruded downwardly to the flange portion 3a from the rectangular hole of the first rotor 3 and held by the holding portion 3b.

The stator 7 consists of a cylindrical cable case 8 and a disk-like lower cover 9, both of which are formed from an insulating material. A top surface plate 8a is integrally formed at the top end portion of the cable case 8 in such a manner as to extend over the entire inner circumference of the case 8 and as to have an opening 8b at the central portion thereof. The lower cover 9 has a hole 9a formed in the central portion thereof and an arcuate groove 9b opened at an end thereof to the outer circumferential portion, and is attached to the bottom end portion of the cable case 8. The hole 9a and the opening 8b of the cable case 8 face to each other and constitute the through hole 10. Moreover, the inside of the cable case 8 communicates with the outside thereof through the groove 9b. Further, the first rotor 3 is inserted from the opening 8b into this stator 7. The flange portion 3a abuts against the top surface plate 8a. Furthermore, the bottom end portion of the rotary-side lead block 4 is placed in the cable connector 8. The connecting cable 5 and the connector 6 are placed outside the stator 7.

The stationary-side lead block 11 has a top end portion, to which a connector 13 is attached through a connecting cord 12, and a bottom end portion supported by the lower cover 9 and is placed in the stator 7. Further, the connecting cord 12 and the connector 13 are led to the outside of the stator 7 through the groove 9b of the lower cover 9.

The flexible cable 14 is constituted by embedding a plurality of electrically conductive wires in flexible elongated tape in such a way as to extend in the longitudinal direction of the tape. Both end portions of any of the electrically conductive wires are exposed from the surface of the tape at both end portions of the tape. Further, this flexible cable 14 is wound around the outer circumferential wall of the first rotor 3 and accommodated in the stator 7. The flexible cable 14 has an end portion, which is supported at the bottom end portion of the rotary-side lead block 4 and electrically connected to the connector 6 through the connecting cord 5, and also has the other end portion that is supported at the top end portion of the stationary-side lead block 11 and electrically connected to the connector 13 through the connecting cord 12.

The second rotor 15 is formed from an insulating material like a cylinder, and has a top end portion, in which a claw portion 15a is integrally formed like a ring in such a way as to extend over the outer circumferential wall and in which a pair of notch portions 15b are shaped like the contour of a pen head tapered off toward the bottom end thereof and opposed to each other. Further, a flange portion 15c is integrally formed to the bottom end portion of the second rotor 15 and shaped like a ring in such a manner as to extend over the entire circumference of the outer circumferential wall. A pair of hole portions 15d and 15e serving as passage portions are bored in this flange portion 15c in such a way as to be separated 180°. One 15d of the hole portions has a larger diameter, as compared with the other hole portion 15e. Further, this second rotor 15 is inserted into the stator 7 from the hole 9a of the lower cover 9. The second rotor 15 is connected through the through hole 10 to the first rotor 3 by latching the claw portion 15a onto the step-like portion 3c of the first rotor 3 and by holding the claw portion 15a. The second rotor 15 is rotatably supported by the stator 7 together with the first rotor 3 so that the flange portion 15c abuts against the bottom surface of the lower cover 9. The extension portion 3e and the projection 3f are inserted into and engaged with the pair of hole portions 15d and 15e, respectively. The extension portion 3e and the projection 3f protrude from the bottom surface of the flange portion 15c. The flange portion 15c abuts against the bottom surface of the lower cover 9. The second rotor 15 is rotatably supported by the stator 7 together with the first rotor 3 so that the flexible cable 14 is placed between these rotors.

On the other hand, the steering angle sensor 16 comprises a rotary member 25, which connects an upper rotary member 17 to a lower rotary member 24, a stationary member 18, which supports this rotary member 25 so that this rotary member 25 can rotate, and an amount-of-rotation detecting means 21 that is supported by the stationary member 18 and adapted to detect an amount of rotation of the rotary member 25.

The upper rotary member 17 is formed from an insulating material like a cylinder. A flange portion 17a is integrally formed like a ring in such a manner as to extend over the entire circumference of an outer wall at the top end portion of the upper rotary member 17. In this flange portion 17a, a pair of elongated holes 17b and 17c are formed in such a manner as to be separated 180°. Further, a pair of elastic pieces 17d are formed like a fork in the latter elongated hole 17c in such a manner as to project from a inner side of the latter hole 17c to the outside in parallel with each other. Each of the pair of elastic pieces 17d has elasticity in the direction of the circumference of the flange portion. Moreover, a step-like portion 17e is formed on the inner circumferential surface of the upper rotary member 17 in such a way as to inwardly extend over the entire circumference of the upper rotary member 17 from the central portion to the bottom portion of the member 17. A pair of convex portions 17f projecting outwardly are formed on the bottom portion of this step-like portion 17e in such a manner as to be separated 180°.

The stationary member 18 is constituted by an upper insulating case 19 and a lower insulating case 20 and formed like a cylinder. A top surface plate 19a of the upper case 19 and a bottom surface plate 20a of the lower case 20 have hole portions 19b and 20b, respectively. Further, the upper rotary member 17 is inserted from the hole portion 19b of the upper case 19 into this stationary member 18. The flange portion 17a abuts against the top surface plate 19a of the upper case 19. The step-like portion 17e and the pair of convex portions 17f are placed in the stationary member 18.

The amount-of-rotation detecting means 21 comprises a disk-like code plate 22, in which a plurality of slits 22a are formed at a predetermined interval in a circumferential direction, and a detecting device 23 having a light emitting element 23a and a light receiving element 23b placed on an outer circumferential portion of this code plate 22 in such a manner as to put the slits 22a therebetween. A pair of holes 22b are formed in this code plate 22 in such a manner as to be shifted in phase at an interval of 180°. Further, the amount-of-rotation detecting means 21 is placed in the stationary member 18. The pair of convex portions 17f are inserted into the pair of holes 22b of the code plate 22, respectively. The detecting device 23 is supported by the inner circumferential wall of the upper case 19.

The lower rotary member 24 is formed from an insulating material like a cylinder. A flange portion 24a is integrally formed like a ring in such a manner as to extend over the entire circumference of an outer wall at the bottom end portion of the lower rotary member 24. A pair of concave portions 24b are formed on the top surface of this lower rotary member 24 in such a way as to be separated 180°. Further, this lower rotary member 24 is inserted into the stationary member 18 from the hole portion 20b of the lower case 20. The pair of convex portions 17f of the upper rotary member 17 are fitted into the pair of concave portions 24b, respectively. Thus, the code plate 22 is sandwiched between the upper and lower cases. The lower rotary member 24 is rotatably supported by the stationary member 18 together with the upper rotary member 17 by causing the flange portion 24a to abut against the bottom surface plate 20a of the lower case 20.

Figure 9:
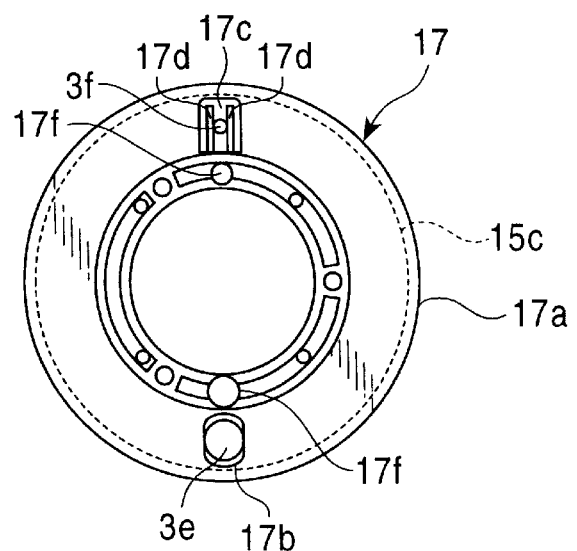
FIG. 9 is a diagram illustrating the relation between the upper rotary member of the steering angle sensor and the second rotor of the rotary connector of the steering angle sensor unit of the present invention.
Figure 10:
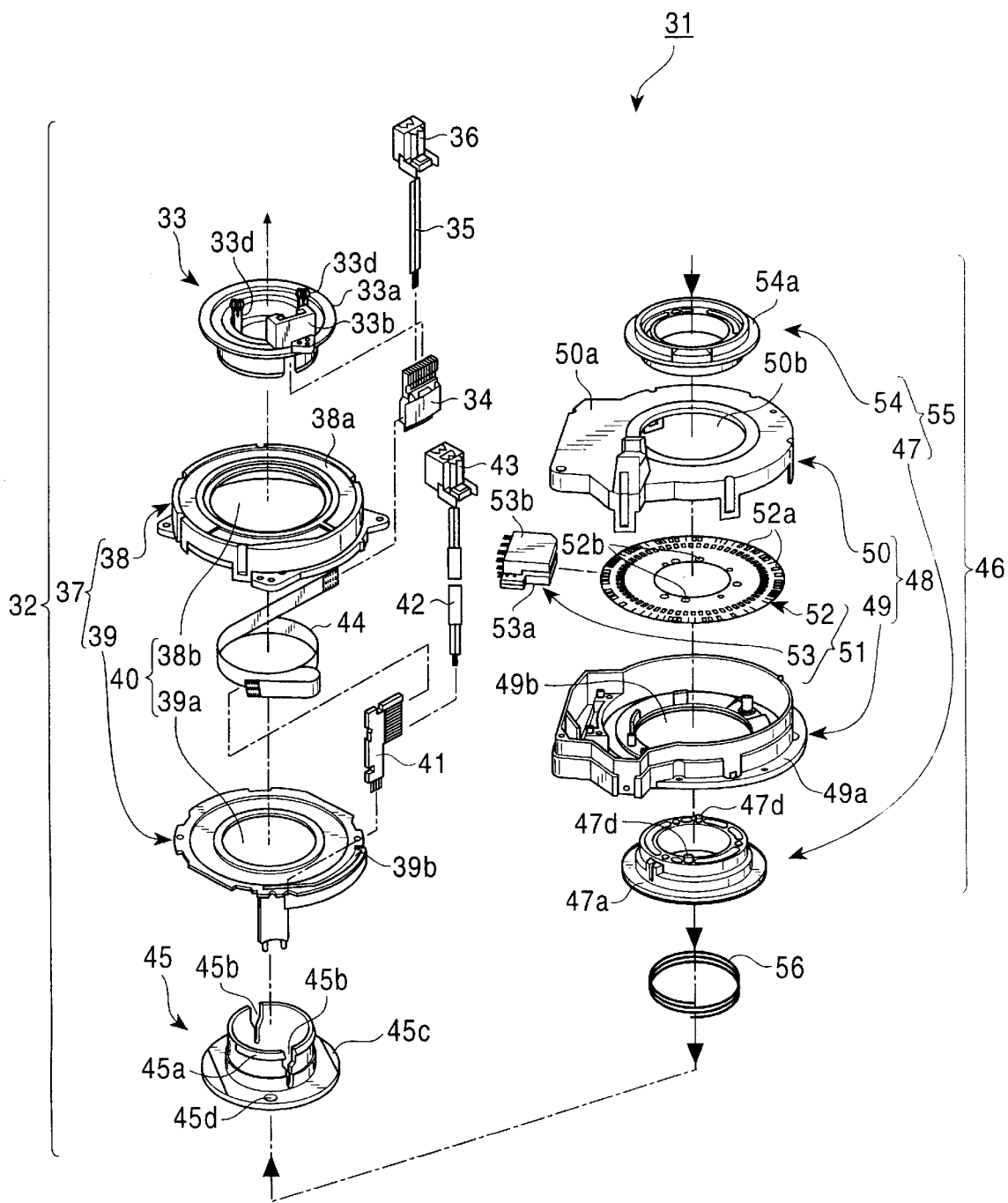
FIG. 10 is an exploded perspective view of a conventional steering angle sensor unit.
Figure 11:
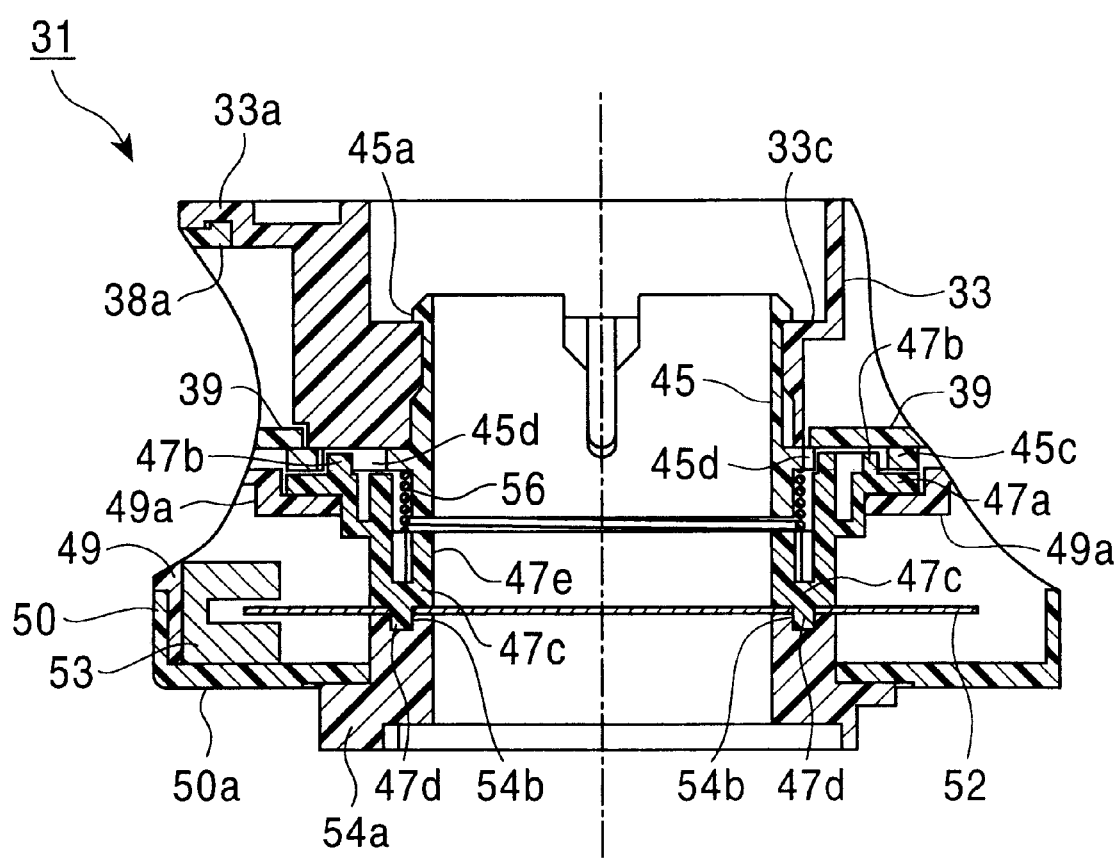
FIG. 11 is a sectional view of the conventional steering angle sensor unit.

Furthermore, in the steering angle sensor 16 configured as described above, a coil spring 26 is put on the ring-like projection 17e. The upper rotary member 17 is placed in such a manner as to face the second rotor 15. The upper case 19 is attached to the lower cover 9 of the rotary connector 2 by using appropriate means, such as screws. Thus, the steering angle sensor unit 1 is configured by being fixed to the rotary connector 2. The first rotor 3 is placed more apart from the rotary member 25 than the second rotor 15. As illustrated in FIG. 8, the pair of elongated holes 17b and 17c and the pair of elastic pieces 17d extend in a direction nearly perpendicular to the axis R of rotation. As shown in FIG. 9, an extension portion 3e is placed in such a way as to have a space in the longitudinal direction of a transversal section of one of the elongated holes 17b. Further, the outer circumferential surface of the extension portion 3e engages with the inner edge in the transversal direction of this elongated hole 17b. Thus, the first rotor 3 is directly connected to the rotary member 25. A projection 3f is placed between the pair of elastic pieces 17d in the other elongated hole 17c and sandwiched therebetween. Furthermore, the coil spring 26 compressed and sandwiched between the step-like portion 17e and the flange portion 15c of the second rotor 15 presses the second rotor 15 and the upper rotary member 17 in a direction in which the rotor 15 becomes a little more apart from the member 17. Consequently, the flange portion 17a is a little apart from the flange portion 15c of the second rotor 15.

Next, a method of assembling this steering angle sensor unit 1 will be described hereinbelow. First, the rotary connector 2 is assembled as follows. That is, the rotary-side lead block 4, to which the connector 6 is attached through the connecting cord 5, is fitted into the holding portion 3b of the first rotor 3. Then, the first rotor 3 is inserted from the opening 8b into the cable case 8. Thus, the flange portion 3a is caused to abut against the top surface plate 8a. Subsequently, the stationary-side lead block 11, to which the connector 13 is attached through the connecting cord 12, is attached to the lower cover 9. A part, which is provided to the stationary-side lead block 11, of the connecting cord 12 is fitted into the groove 9b of the lower cover 9. Next, in the cable case 8, the flexible cable 14 is wound around the first rotor 3. Then, both end portions of the flexible cable 14 are attached to the bottom end portion of the rotary-side lead block 4 and the top end portion of the stationary-side lead block 11. Thereafter, the lower cover 9 is attached to the bottom end portion of the cable case 8 by using suitable means, such as screws.

Further, when the second rotor 15 is inserted into the stator 7 from the hole 9a of the lower cover 9 so that the pair of hole portions 15d and 15e respectively correspond to the extension portion 3e and the projection 3f, the claw portion 15a formed at the top end portion of the second rotor 15 touches the step-like portion 3c of the first rotor 3. When the second rotor 15 is pushed still more into the stator 7 in this state, the claw portion 15a and the second rotor 15 inwardly bend owing to the elasticity of the second rotor 15. Furthermore, when the claw portion 15a passes through the step-like portion 3c, the claw portion 15a and the second rotor 15 are restored to an original state. Then, the claw portion 15a is caught onto the step-like portion 3c and held thereon. That is, the second rotor 15 is connected to the first rotor 3 by snap fit.

In the rotary connector 2 assembled in this way, the flexible cable 14 is placed among the first rotor 3, the second rotor 15 and the stator 7. The flange portions 3a and 15c of the first and second rotors 3 and 15 abut against the top surface plate 8a of the cable case 8 and the bottom surface of the lower cover 9, respectively. The extension portion 3e and the projection 3f are inserted into and engaged with the pair of hole portions 15d and 15e, and project from the bottom surface of the flange portion 15c. Further, the connectors 6 and 13 are placed outside the stator 7.

On the other hand, the steering angle sensor 16 is assembled as follows. First, the detecting device 23 having the light emitting element 23a and the light receiving element 23b is supported on the inner circumferential wall of the upper case 19. Then, the code plate 22 is placed between the light emitting element 23a and the light receiving element 23b. Subsequently, the upper rotary member 17 is inserted from the hole portion 19b into the upper case 19. The bottom end portions of the upper rotary member 17 and the step-like portion 17e are made to abut against the code plate 22 by inserting the pair of convex portions 17f into the pair of holes 22b. Then, the lower case 20 and the upper case 19 are combined with each other and attached to each other by using suitable means, such as screws. Subsequently, the lower rotary member 24 is inserted from the hole portion 20b of the lower case 20 into the stationary member 18. Then, the pair of convex portions 17f are fitted into the pair of concave portions 24b. Thus, the lower rotary member 24 is attached to the upper rotary member 17.

In the steering angle sensor 16 assembled in this way, the flange portion 17a of the upper rotary member 17 abuts against the top surface plate 19a of the upper case 19. Moreover, the flange portion 24a of the lower rotary member 24 abuts against the bottom surface plate 20a of the lower case 20. Furthermore, the code plate 22 is sandwiched between the bottom end portion of the upper rotary member 17 and the top end portion of the lower rotary member 24.

Further, thereafter, the coil spring 26 is put on the step-like portion 17e of the upper rotary member 17. The extension portion 3e and the projection 3f are inserted between one 17b of the elongated holes and the pair of elastic pieces 17d, so that the flange portion 17a is faced to the flange portion 15c of the second rotor 15. The upper case 19 is attached to the lower cover 9 of the rotary connector 2 by using appropriate means, such as screws. Thus, the assembling of the steering angle sensor unit 1 is completed. Upon completion of assembling thereof, first rotor 3 is placed more apart from the rotary member 25 than the second rotor 15. As illustrated in FIG. 8, the pair of elongated holes 17b and 17c and the pair of elastic pieces 17d extend in a direction perpendicular to the axis R of rotation. As shown in FIG. 9, the extension portion 3e is placed in such a way as to have a space in the longitudinal direction of the transversal section of one of the elongated holes 17b. Further, the outer circumferential surface of the extension portion 3e engages with the inner edge in the transversal direction of this elongated hole 17b. Thus, the first rotor 3 is connected to the rotary member 25. A projection 3f is placed between the pair of elastic pieces 17d in the other elongated hole 17c and sandwiched therebetween. Furthermore, the coil spring 26 compressed and sandwiched between the step-like portion 17e and the flange portion 15c of the second rotor 15 presses the second rotor 15 and the upper rotary member 17 in a direction in which the rotor 15 becomes a little more apart from the member 17.

The steering angle sensor unit 1 assembled in this way is incorporated into an automobile or the like. The stator 7 of the rotary connector 2 is fixed to a car body. The pair of engaging projections 3d of the first rotor 3 are connected to a hub of a steering shaft. Thus, the connector 6 is connected to an air bag or a horn provided on the steering wheel, while the connector 13 is connected to a drive circuit for an air bag or a horn provided on the car body. Furthermore, the detecting device 23 is used by being connected to a computer for controlling the car body. Namely, when the steering wheel is operated, the first rotor 3 rotates around the axis R of rotation. Thus, the flexible cable 14 is wound or rewound, so that the electrical connection between the steering wheel and the car body is always maintained. The engagement between the extension portion 3e and one 17b of the elongated holes enables the direct transmission of rotation of the first rotor 3 to the rotary member 25 without using the second rotor 15, so that the rotary member 25 rotates around the axis R of rotation. Thus, if a play between the first and second rotors 3 and 15 is caused, the amount of rotation of the first rotor 3 is always equal to that of rotation of the rotary member 25. Therefore, light emitted from the light emitting element 23a provided in the detecting device 23 is received by the light receiving element 23b through the slits 22a, so that the amount of rotation of the first rotor 3 can be accurately detected by sensing an amount of rotation of the code plate 22. Further, a detection signal obtained in this way is inputted to the computer provided in the car body. Then, this computer controls a suspension damping system, based on this detection signal, in response to the operation of the steering wheel, and a shift position of an automatic transmission, and a rear wheel steering mechanism of a 4-wheel steering system (4WS).

Further, the extension portion 3e and the projection 3f serving as passage portions are inserted into and engaged with the pair of hole portions 15d and 15e, respectively. Thus, the first rotor 3 can smoothly rotate in a state in which there is no play between the stator 7 and the second rotor 15.

Moreover, the extension portion 3e is placed in such a way as to have a space in the longitudinal direction of the transversal section of one 17b of the elongated holes. Furthermore, the outer circumferential surface of the extension portion 3e engages with the inner edge in the transversal direction of this elongated hole 17b. Thus, the first rotor 3 and the rotary member 25 are connected by a simple configuration. Additionally, if a backlash between the first and second rotors 3 and 15 is caused during the period when these rotors 3 and 15 rotate in a direction perpendicular to the axis R of rotation, this backlash is absorbed by winding and rewinding the flexible cable 14 and by causing the extension portion 3e to slide in the longitudinal direction of the transversal section of the elongated hole 17b by being guided on the inner edge in the transversal direction of the transverse section of the elongated hole 17b. Consequently, the first and second rotors 3 and 15 and the rotary member 25 can smoothly rotate.

Further, the projection 3f is placed between the pair of elastic pieces 17d in the other elongated hole 17c. The pair of elastic pieces 17d are in elastic contact with the projection 3f. Thus, if a backlash is caused in a direction of rotation of each of the first and second rotors 3 and 15 (that is, in the direction of the circumference of the flange portion 17a), this backlash is absorbed by the bending of the pair of elastic pieces 17d. The rotation of each of the first and second rotors 3 and 15 is reliably transmitted to the rotary member 25 by using the pair of elastic pieces 17d in collaboration with the extension portion 3e. Consequently, the amount of rotation of each of the first and second rotors 3 and 15 can be detected with good precision by the amount-of-rotation detecting means 21.

The coil spring 26 compressed and sandwiched between the step-like portion 17e of the rotary member 25 and the flange portion 15c of the second rotor 15 presses the second rotor 15 and the upper rotary member 17 in a direction in which the rotor 15 and the member 17 are more apart from each other. Thus, if a backlash is caused during the period when the first and second rotors 3 and 15 rotate in a direction parallel with the axis R of rotation, the backlash can be made to be small by pressing the flange portion 15c of the second rotor 15 to the bottom surface of the lower cover 9. Consequently, the first and second rotors can be stably rotated. Furthermore, each of the distance between the light emitting element 23a and the code plate 22 and the distance between the code plate 22 and the light receiving element 23b can be maintained at a constant value by pressing the flange portion 17a of the upper rotary member 17 to the top surface plate 19a of the upper case 19. Consequently, a stable output of a detection signal can be obtained.

Incidentally, although the extension portion 3e is formed in the first rotor 3 and one 17b, with which the extension portion 3e is engaged, of the elongated holes is formed in the upper rotary member 17 in this embodiment, the present invention is not limited to this embodiment.

Further, the extension portion 3e and the projection 3f are inserted into and engaged with the pair of hole portions 15d and 15e serving as the passage portions. Thus, if the configuration, in which an end portion of the flexible cable 14 is supported by the first rotor 3, is changed into a configuration, in which an end portion of the flexible cable 14 is supported by the second rotor 15, the first and second rotors 3 and 15 can smoothly rotate with respect to the stator 17 as a single body. Consequently, the winding and rewinding of the flexible cable 14 are smoothly achieved.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A steering angle sensor unit comprising:
   a rotary connector, which has a stator having a through hole, and which has first and second rotors placed across the stator in such a way as to face each other and connected to each other through the through hole and rotatably supported, and which has a flexible cable, placed in such a manner as to be would among the first, second rotors, and the stator, and as to have an end portion supported by the stator and an opposing end portion supported by one of the first and second rotors; and
   a steering angle sensor, which has a rotary member rotatably supported by a stationary member and which has an amount-of-rotation detecting means for detecting an amount of rotation of the rotary member,
   wherein said second rotor is disposed to face said rotary member,
   wherein said first rotor is disposed further from said rotary member than the second rotor,
   wherein an extension portion is provided in one of said first rotor and said rotary member,
   wherein said first rotor is directly connected to said rotary member by said extension portion, and
   wherein said first and second rotors and said rotary member are rotated as a single body by transmitting rotation of said first rotor to said rotary member.

2. The steering angle sensor unit according to claim 1, wherein said first rotor is essentially cylindrical,
   wherein said first rotor is engaged with said second rotor and held thereon, wherein said extension portion is provided on a bottom end portion of said first rotor, wherein a passage portion, in which said extension portion is inserted, is provided in said second rotor, and wherein said extension portion is inserted in and engaged with said passage portion, such that said first and second rotors and said rotary member are rotated as a single body.

3. The steering angle sensor unit according to claim 1, wherein an elongated hole extending in a direction perpendicular to an axis of rotation of said rotary member is provided in said rotary member, wherein an outer circumferential surface, with which the elongated hole is engageable in a transversal direction thereof, is provided in said extension portion, wherein said extension portion is inserted into the elongated hole, wherein a space is formed in a longitudinal direction of the elongated hole, wherein said outer circumferential surface engages with the elongated hole in the transversal direction of the hole, and wherein said extension portion is slidable in the longitudinal direction of the elongated hole.

4. The steering angle sensor unit according to claim 3, wherein a pair of elastic pieces extending in a direction nearly perpendicular to the axis of rotation are provided in said rotary member, wherein a projection is provided on said first rotor, and wherein said projection is sandwiched between said pair of elastic pieces.

5. The steering angle sensor unit according to claim 1, wherein a coil spring is disposed between said second rotor and said rotary member, and wherein said spring pushes said second rotor and said rotary member in a direction in which said second rotor and said rotary member become apart from each other.

6. The steering angle sensor unit according to claim 2, wherein an elongated hole extending in a direction perpendicular to an axis of rotation of said rotary member is provided in said rotary member, wherein an outer circumferential surface, with which the elongated hole is engageable in a transversal direction thereof, is provided in said extension portion, wherein said extension portion is inserted into the elongated hole, wherein a space is formed in a longitudinal direction of the elongated hole, wherein said outer circumferential surface engages with the elongated hole in the transversal direction of the hole, and wherein said extension portion is slidable in the longitudinal direction of the elongated hole.

7. The steering angle sensor unit according to claim 6, wherein a pair of elastic pieces extending in a direction nearly perpendicular to the axis of rotation are provided in said rotary member, wherein a projection is provided on said first rotor, and wherein said projection is sandwiched between said pair of elastic pieces.

8. The steering angle sensor unit according to claim 2, wherein a coil spring is disposed between said second rotor and said rotary member, and wherein said spring pushes said second rotor and said rotary member in a direction in which said second rotor and said rotary member become apart from each other.

9. The steering angle sensor unit according to claim 3, wherein a coil spring is disposed between said second rotor and said rotary member, and wherein said spring pushes said second rotor and said rotary member in a direction in which said second rotor and said rotary member become apart from each other.

10. The steering angle sensor unit according to claim 4, wherein a coil spring is disposed between said second rotor and said rotary member, and wherein said spring pushes said second rotor and said rotary member in a direction in which said second rotor and said rotary member become apart from each other.

11. The steering angle sensor unit according to claim 6, wherein a coil spring is disposed between said second rotor and said rotary member, and wherein said spring pushes said second rotor and said rotary member in a direction in which said second rotor and said rotary member become apart from each other.

12. The steering angle sensor unit according to claim 7, wherein a coil spring is disposed between said second rotor and said rotary member, and wherein said spring pushes said second rotor and said rotary member in a direction in which said second rotor and said rotary member become apart from each other.

* * * * *